June 23, 1942.    A. HOLLANDER    2,287,034
PUMPING APPARATUS
Filed Dec. 31, 1938
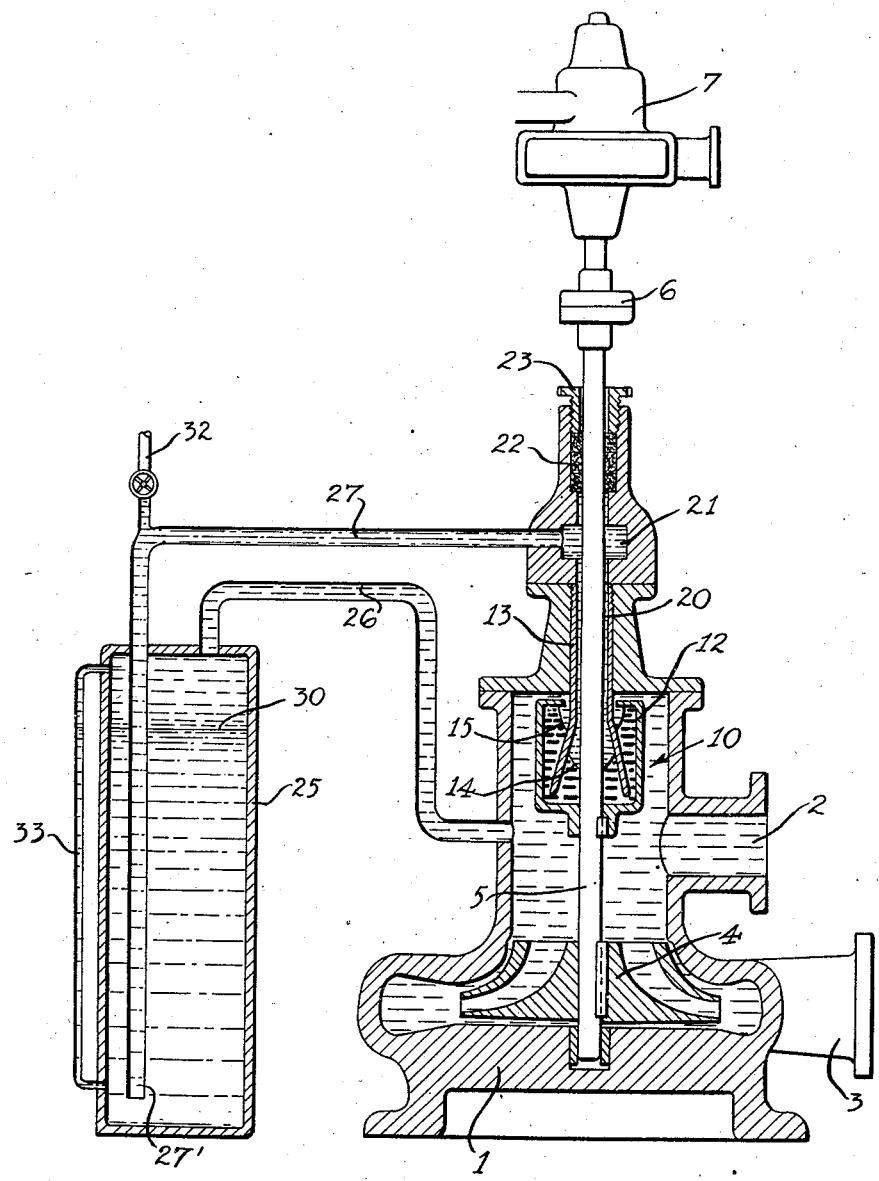
Aladar Hollander
INVENTOR
BY John D. Chesnut
ATTORNEY Patented June 23, 1942

2,287,034

UNITED STATES PATENT OFFICE 2,287,034

PUMPING APPARATUS

Aladar Hollander, Los Angeles, Calif., assignor to Byron Jackson Co., Huntington Park, Calif., a corporation of Delaware Application December 31, 1938, Serial No. 248,730

4 Claims. (Cl. 103—111)

This invention relates generally to pumping apparatus, and particularly to apparatus for handling liquids of such nature that it is highly objectionable and often dangerous to permit any leakage thereof from the pump.

Pumps designed for handling liquids at high pressure usually have the stuffing box at the suction end of the pump in order to subject the stuffing box to the lowest possible pressure. If, however, the liquid is being handled at high suction pressure, the problem of avoiding leakage at the stuffing box is extremely difficult. If the liquid is one having a vapor pressure less than atmospheric pressure and in addition is inflammable, as in the case of butane or propane, the slightest leakage creates a highly dangerous condition.

Many previous attempts have been made to develop a packed stuffing box which will form a perfect seal against leakage of such liquids, but so far as I am aware such attempts have been unsuccessful. It appears to be necessary to resort to other means than a stuffing box for this purpose. One arrangement which has proven to be a successful solution of this problem consists in mounting both the pump and its prime mover within a fluid-tight housing, thus eliminating all stuffing boxes. This was made possible by the development of a submersible electric motor capable of operating while submerged in the pumped liquid. Such an arrangement is not possible, however, if other types of prime movers such as steam turbines are employed.

A principal object of this invention is to provide pumping apparatus capable of being driven by an external prime mover and in which leakage of pump liquid along the shaft is completely eliminated.

This object is accomplished by interposing between the pump liquid and the conventional stuffing box an auxiliary body of liquid which is separated from the pump liquid by a positive liquid seal. It will be appreciated by those skilled in this art that it would be impossible to merely substitute a liquid seal for the usual stuffing box under the conditions outlined above. The pressures on opposite sides of the sealing liquid must be substantially balanced in order that a liquid seal function properly.

A further object of the invention is to provide an arrangement permitting the use of a pressure-balanced liquid seal around a pump shaft projecting into the atmosphere from the interior of a pump filled with liquid at high pressure.

Generally speaking, my invention consists in the provision of a liquid seal surrounding the pump shaft within the pump casing, the sealing liquid being exposed on one side to the pump liquid and on the other side to an auxiliary liquid. A balance chamber is provided for subjecting the auxiliary liquid to the pressure of the pump liquid whereby the pressures on opposite sides of the sealing liquid are balanced at all times. A conventional stuffing box is provided between the auxiliary liquid and the atmosphere. The auxiliary liquid may be a harmless, non-volatile liquid such as water or oil, and consequently slight leakage such as is customary through a conventional stuffing box is not objectionable. The important feature is the absolute seal against leakage of the pump liquid along the shaft.

In order to enable those skilled in this art to fully understand the invention and to fully appreciate the advantages thereof, I have illustrated more or less schematically in the accompanying drawing one embodiment of the invention, showing the pump and the shaft sealing means in vertical section and the prime mover in elevation.

Referring to the drawing, reference numeral 1 designates a pump casing having a suction inlet 2 and a discharge outlet 3. An impeller 4 is rotatably mounted within the casing, being keyed to an impeller shaft 5. The shaft extends through the pump casing and is connected by a coupling 6 to a drive means such as a steam turbine indicated at 7.

In order to prevent any leakage of pump liquid along the shaft where it projects through the pump casing, a liquid seal is provided as indicated generally at 10. For illustrative purposes I have shown this seal as of the type illustrated and described in Patent No. 2,002,917, dated May 28, 1935, to Earl Mendenhall and Junius B. Van Horn. It will be understood, however, that the specific construction of the liquid seal forms no part of this invention. The essential elements of the seal comprise a cup-shaped member 12 secured to the shaft 5 to rotate therewith, and a stationary baffle 13 secured to the pump casing and projecting into the cup 12. The latter contains a body of mercury or other sealing liquid, which is divided by the baffle 13 into inner and outer zones having contact surfaces 14 and 15, respectively, on opposite sides of the baffle. The outer surface 15 contacts the pump liquid in the pump casing, while the inner surface 14 is in contact with an auxiliary body of liquid which is interposed between the liquid seal and the exterior of the pump for a purpose which will be described presently.

It is essential to successful functioning of a liquid seal that the pressures on the contact surfaces 14 and 15 on opposite sides of the baffle be substantially equal, since any material preponderance of pressure on one side would break the seal. For this reason prior uses of liquid seals have been limited, so far as I am aware, to those instances wherein a shaft to be sealed projects from a housing which is under substantially equal internal and external pressures. It will be evident, however, that this condition does not prevail in a pump when handling liquid at high suction pressure and subjected externally to only atmospheric pressure. Under these conditions it would be impossible to substitute a liquid seal for the usual stuffing box, exposing the inner contact surface 14 to atmospheric pressure.

By the present invention I have made it possible to utilize a liquid seal under conditions of high pressure difference on opposite sides of the casing, by interposing an auxiliary body of liquid between the seal and the outside of the casing, the auxiliary liquid being subjected to the pressure of the pump liquid to balance the seal.

Referring again to the drawing, it will be observed that the baffle 13 extends upwardly in spaced relation to the shaft 5, defining a channel 20 communicating with a chamber 21. Above this chamber is a conventional stuffing box comprising packing 22 and a follower 23. The chamber 21 contains an auxiliary liquid, preferably one which is non-volatile, non-inflammable, and otherwise harmless.

A balance chamber is provided in the form of a closed vessel 25. Conduits 26 and 27 extend respectively from the interior of the pump casing 1 and from the auxiliary liquid chamber 21 to the balance chamber in order to subject the auxiliary liquid to the pressure of the pump liquid. In the present instance it is assumed that the auxiliary liquid is of a higher specific gravity than the pump liquid, and therefore the conduit 27 is provided with a portion 27' extending to adjacent the lower end of the balance chamber. In this way admixture of the two liquids is minimized.

As an aid in distinguishing between the three liquids, the pump liquid has been indicated in the drawing by light broken lines, the sealing liquid by heavy broken lines, and the auxiliary liquid by dot-and-dash lines. It will be observed that pump liquid fills the interior of the pump casing, contacting the surface 15 of the sealing liquid, and extending through the conduit 26 and occupying the upper portion of the sealing chamber down to the level indicated at 30. The auxiliary liquid occupies the remaining portion of the balance chamber, the conduits 27, 27', the chamber 21, and the channel 20, contacting the surface 14 of the sealing liquid. The pressures at the contact faces 14 and 15 are thus equalized, irrespective of the difference in pressures internally and externally of the pump casing.

It is contemplated that some leakage of auxiliary liquid may occur along the shaft past the packing 22 when the pressure differential across the packing is unusually high. However, since this liqud is harmless no special precaution need be taken to prevent this leakage. It is only necessary to make provision for replacement in the balance chamber of auxiliary liquid leaking past the packing. A valved make-up line 32 may be connected to the conduit 27 for this purpose, and the size of the balance chamber may be such that considerable leakage may occur before it becomes necessary to add make-up liquid. A gauge 33 may be connected to the balance chamber to indicate the relative amounts of pump liquid and auxiliary liquid in the balance chamber.

It is preferable that the auxiliary liquid be immiscible with the pump liquid, although this is not essential because the contact between the two liquids in the balance chamber is in a quiescent zone. If there is an appreciable difference in the specific gravities of the two liquids, any admixing thereof will be confined to the immediate region of the contact between the liquids.

The system described above is particularly applicable to pumps handling butane or propane. Because of the fire hazard involved in handling these substances, rigid precautions against leakage are necessary. Having a vapor pressure at room temperature less than atmospheric pressure, any leakage from the pump immediately vaporizes and creates a highly dangerous condition. The present invention effectively prevents any leakage of the pump liquid along the shaft, however, since the liquid seal constitutes a complete barrier between the pump liquid and the atmosphere.

It will be understood that the invention is not restricted in its application to pumping apparatus for handling propane or other volatile, inflammable compounds, but is applicable wherever a perfect seal is required and the pressure difference is such that leakage cannot be prevented by a conventional stuffing box.

It will further be understood that the accompanying drawing is merely a schematic illustration of one embodiment of the invention and that it is not limited to the particular structural features shown therein. For example, the pump need not be of the centrifugal type shown, but may be of any type having an actuating member capable of being sealed by a liquid seal. Also, the specific nature of the driving means is immaterial.

I claim:

1. Pumping apparatus comprising, in combination: a pump casing having walls defining a chamber adapted to contain pump liquid at a pressure substantially greater than the external pressure to which the casing is exposed, said casing having a shaft opening therein; a pumping element in said casing; pump driving means disposed externally of said casing; a drive shaft extending from said driving means through said shaft opening and through said chamber into driving relation with said pumping element; a stuffing box around the shaft at its juncture with the casing, said stuffing box being exposed internally to the relatively high pressure of the pump liquid in said chamber and being exposed externally to the relatively low external pressure on said casing; and means for preventing leakage of pump liquid from said chamber through the stuffing box, comprising walls defining an intermediate chamber surrounding said shaft between the stuffing box and said first chamber and containing a second liquid dissimilar to said pump liquid, a liquid seal around said shaft and sealing said intermediate chamber from said first chamber, and means for establishing pressure transfer relation between the pump liquid and the second liquid whereby the pressures on opposite sides of said liquid seal are equalized.

2. Pumping apparatus as defined in claim 1, wherein said last-named means comprises walls defining a balance chamber communicating with said first and intermediate chambers and containing bodies of pump liquid and second liquid in pressure transfer relation to each other.

3. Pumping apparatus as defined in claim 1, in which said last-named means comprises walls defining a balance chamber containing bodies of pump liquid and second liquid in pressure transfer relation to each other, conduit means communicating between said body of pump liquid and said first chamber, and other conduit means communicating between said body of second liquid and said intermediate chamber.

4. Pumping apparatus as defined in claim 1, in which said last-named means comprises walls defining a balance chamber containing bodies of pump liquid and second liquid in pressure transfer relation to each other, conduit means communicating between said bodies of pump liquid and second liquid and said first and intermediate chambers, respectively, and a valved connection between said body of second liquid and a source of supply of second liquid.

ALADAR HOLLANDER.